United States Patent
Yang et al.

(10) Patent No.: US 6,487,335 B1
(45) Date of Patent: Nov. 26, 2002

(54) DISTRIBUTED FILTER FOR DWDM CASCADE DEVICE USING MACH-ZEHNDER INTERFEROMETERS

(75) Inventors: Yawen Yang, Newark, CA (US); Wenyong Zhu, Fremont, CA (US)

(73) Assignee: Tera Fiberoptics, Inc., Fremont, CA (US)

( * ) Notice: Subject to any disclaimer, the term of this patent is extended or adjusted under 35 U.S.C. 154(b) by 203 days.

(21) Appl. No.: 09/679,897

(22) Filed: Oct. 5, 2000

(51) Int. Cl.⁷ ............................. G02B 6/28; H04J 14/00; H04J 14/02; H04B 10/20
(52) U.S. Cl. .................... 385/24; 359/115; 359/118; 359/124; 359/127; 385/15
(58) Field of Search ...................... 385/15, 24, 37, 385/46, 39, 42, 50; 359/127, 115, 124, 160, 279, 344, 118, 128, 130

(56) References Cited

U.S. PATENT DOCUMENTS

| | | | | |
|---|---|---|---|---|
| 5,852,505 A | * | 12/1998 | Li | 359/118 |
| 5,978,114 A | * | 11/1999 | Clark et al. | 359/115 |
| 6,069,732 A | * | 5/2000 | Koch et al. | 359/160 |
| 6,141,130 A | * | 10/2000 | Ip | 359/124 |
| 6,160,932 A | * | 12/2000 | Huang et al. | 359/124 |
| 6,256,433 B1 | * | 7/2001 | Luo et al. | 359/124 |
| 6,349,158 B1 | * | 2/2002 | Yang et al. | 359/127 |
| 6,404,521 B1 | * | 6/2002 | Yang et al. | 359/115 |

* cited by examiner

Primary Examiner—Akm E. Ullah
(74) Attorney, Agent, or Firm—John F. Schipper (57) ABSTRACT

System and method for wavelength discrimination using a DWDM (N+1)-stage cascade tree structure with distributed filtering to provide acceptable optical isolation and acceptable flat-top wavelength response. Each channel has a Mach-Zehnder interferometer (MZI) that provides wavelength discrimination. The input channel includes an inverted Fabry-Perot etalon (FPE) filter or an inverted, non-symmetric MZI filter that helps provide a desired flat-top response. Each channel in a second stage has a selected conventional MZI filter, and each channel in a third stage has a selected FPE filter, to help provide the desired optical isolation. The number of output channels may be 32, 64 or more.

32 Claims, 4 Drawing Sheets

DISTRIBUTED FILTER FOR DWDM CASCADE DEVICE USING MACH-ZEHNDER INTERFEROMETERS

FIELD OF THE INVENTION

This invention relates to Dense Wavelength Division Multiplexer (DWDM) devices, and more particularly to DWDM cascade structures that incorporate Mach-Zehnder interferometers.

BACKGROUND OF THE INVENTION

A DWDM device can be used to increase the number of communication channels available in a fiber optical system. Today, researchers are studying a few competing technologies. One mature technology, relying on standard thin film filter coatings, is characterized by high signal insertion losses, low channel counts and relatively high cost, and is generally useful only for DWDM devices with channel spacing greater than 50 GHz.

Another competing technology, involving use of Mach-Zehnder interferometers ("MZIs"), is characterized by low signal insertion loss, low polarization dependent low, relatively low cost, high uniformity and high signal crosstalk and is a more attractive choice for DWDM devices with lower channel spacing. However, standard MZI technology suffers from low isolation between adjacent channels and provides an approximately Gaussian shape for the corresponding transmission curves. These latter two problems make it difficult for a DWDM device relying on standard MZI technology to comply with DWDM standards for optical isolation and "flat-top" passband response set down by BellCore. If these two problems can be either solved or reduced in severity, DWDM devices relying on MZI technology could become widely used in voice, data and image communications.

What is needed is a DWDM system having low signal insertion loss, low polarization dependent loss, high uniformity, relatively low signal crosstalk, acceptable channel isolation and acceptably low passband insertion loss. Preferably, the system should have acceptably low cost and should be flexible enough to meet various commercial communication requirements. Preferably, the system should meet or exceed the BellCore standards for optical isolation and for "flat-top" passband response.

SUMMARY OF THE INVENTION

These needs are met by the invention, which uses an improved DWDM cascade structure with distributed filtering and MZI technology to provide acceptable channel isolation for relatively low channel spacing and to comply with the BellCore standards for optical isolation and for flat-top passband response within a channel, over a system of $2^N$ output channels for 25 or 50 GHz (or higher) channel spacing with N=4, 5, 6, . . .

The basic structure is a bifurcated or cascade tree system with N stages, numbered n=1, 2, . . . N, with stage number n having $2^n$ fiber optical channels in parallel, with each channel in stage n having an MZI, defined by two 3 dB couplers and two parallel fiber optic arms of unequal length, at the beginning of the channel, and with each channel except an output channel or port feeding an MZI that is part of stage n+1(n=1, 2, . . . , N−1). A "stage", as used herein, refers to a group of one or more parallel fiber optic channels, with each channel having an MZI positioned at the beginning of the channel for wavelength discrimination. A typical cascade tree structure of fiber optic channels is disclosed and discussed in U.S. Pat. Nos. 5,809,190 and 5,987,201, issued to P. Z. Chen (FIG. 1 and discussion), incorporated by reference herein.

The channels in three independently selected stages, preferably an input channel ("stage 0") and the second and third stages, include one (or more) of several types of special purpose filters. A first filter type is an "inverted" Fabry-Perot etalon ("FPE"), in which wavelengths for one or more transmission minima coincide with selected wavelengths. Each inverted FPE has a relatively small optical finesse F, preferably $F \leq 2$, and has a small selected free spectral range ("FSR") corresponding to the difference between two consecutive wavelengths at which the transmission minima occur.

A second filter type is an "inverted" and non-symmetric MZI, in which wavelengths for one or more transmission minima coincide with selected wavelengths. A non-symmetric MZI does not use first and second 3 dB (50 percent) couplers, one at each end, to couple the signals in each arm of the MZI, but uses two partial couplers, with at least one of the two coupling coefficients differing from 0.5 and being selected to satisfy selected criteria. A filter of the first type or of the second type is incorporated in each channel in a selected stage of the system. Inclusion of a filter of the first type or of the second type provides a flattening of a transmission peak in that channel at each of the selected wavelengths, to facilitate compliance with the BellCore standards for flat-top response.

A third type of filter is a standard (symmetric) MZI, defined by two 3 dB couplers and serving as a filter with a specified FSR, to deepen the optical isolation at specified wavelengths and to facilitate compliance with the corresponding BellCore standard. A fourth type of filter is a conventional FPE, having a modest optical finesse F ($1 \leq F < 6$) and serving as a filter with a specified FSR, to deepen the optical isolation at specified wavelengths and to facilitate compliance with the corresponding BellCore standard. The third type of filter and, separately, the fourth type of filter is incorporated in each channel in one of the selected stages 0–3 in the system.

In one embodiment, involving 50 GHz channel spacing with N=5 stages and 32 output channels, an optimum choice of parameters is F(type 1)=0.7, FSR(type 1)=0.8/4=0.2 nm, α(type 2)=0.04, FSR(type 2)=0.8/4=0.2 nm, FSR(type 3)=1.6 nm, F(type 4)=6 and FSR(type 4)=3.2 nm.

DESCRIPTION OF BEST MODES OF THE INVENTION

Figure 1:
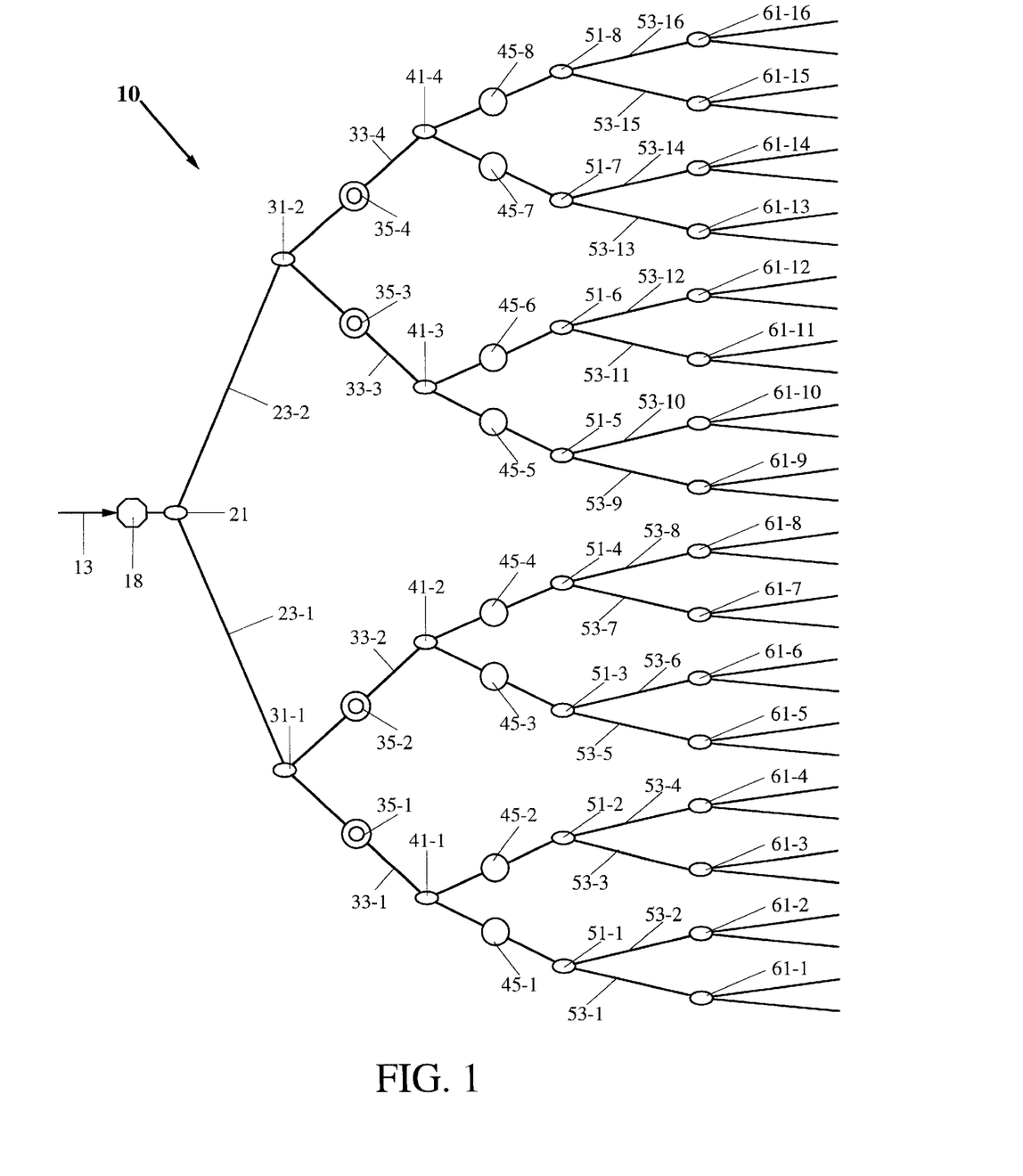
FIG. 1 schematically illustrates a cascade structure for a DWDM device constructed according to the invention.

FIG. 1 illustrates one embodiment 10 of a cascade DWDM structure, which preferably includes one or more MZIs in each channel, to discriminate in favor of, or against, one or more wavelength components. An MZI is discussed generally by M. Born and E. Wolf in *Principles Of Optics*, Pergamon Press, Oxford, Fifth Edition, 1975, pp. 312–316. Use of a tunable optical filters, such as FPEs etalons and MZIs, in a fiber optic network is discussed in a more relevant manner by G. P. Agrawal in *Fiber-Optic Communication Systems*, John Wiley & Sons, New York, Second Edition, 1997, pp. 296–303. In a first embodiment, channels in three of the four stages 0–3 of fiber optic channels also have special purpose optical filters incorporated therein, for improved discrimination between certain groups of wavelengths and to meet or exceed certain transmission standards set forth by BellCore.

Figure 2:
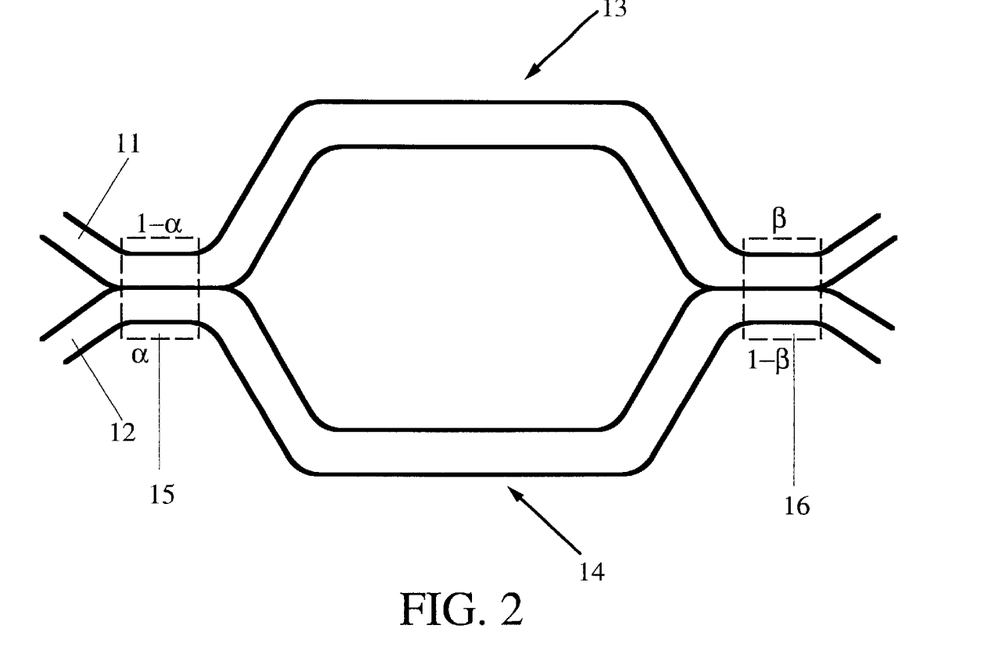
FIG. 2 illustrates a configuration for an MZI used in the invention.

As illustrated in FIG. 2, a conventional (symmetric) MZI has two fibers, 11 and 12, with the respective corresponding arms, 13 and 14, of unequal lengths, L1 and L2, respectively. Each arm, 13 and 14, is defined by first and second 3 dB optical fiber couplers, 15 and 16, spaced apart and arranged serially, with coupling coefficients $\alpha=\beta=0.5$. The initial part of each arm, 13 and 14, immediately following a first fiber coupler 15, carries a portion of a single light beam. However, because of the length difference, or equivalent time delay $$\tau=(L2-L1)/c(\neq 0), \tag{1}$$

interference occurs at the second fiber coupler 16, resulting in transmission of light beyond the second fiber coupler with a transmissivity factor of $$T1(f\tau)=\{1+\cos(2\pi f\tau)\}/2=\cos^2(\pi f\tau), \tag{2}$$

$$T2(f\tau)=\{1-\cos(2\pi f\tau)\}/2=\sin^2(\pi f\tau), \tag{3}$$

$$f=c/\eta\lambda, \tag{4}$$

where f is the frequency corresponding to a wavelength $\lambda$ included in the incident light and $\eta$ is the optical fiber refractive index. For frequencies near $$f=f1(\text{pass})=m/\tau(m=1, 2, 3, \ldots), \tag{5}$$

light having the corresponding wavelength component is passed by the second fiber coupler 16 and appears in the first fiber 11 with little or no transmissivity loss. For frequencies near $$f=f1(\text{exting})=(m+0.5)/\tau(m=0, 1, 2, 3, \ldots), \tag{6}$$

light having the corresponding wavelength component is extinguished (almost) completely in the first fiber 11 beyond the second fiber coupler 16. The full width at half maximum (FWHM) for the overall filtering action in the first fiber 11 is $$\Delta f=FWHM=1/2\tau. \tag{7}$$

$$\Delta\lambda=2c/\eta\lambda. \tag{8}$$

The situation in the second fiber 12, beyond the second fiber coupler 16, is reversed. Light having frequencies near $$f=f2(\text{pass})=(m+0.5)/\tau(m=0, 1, 2, 3, \ldots), \tag{9}$$

appears in the second fiber 12 with little or no transmissivity loss, and light having frequencies near $$f=f2(\text{exting})=m/\tau(m=1, 2, 3, \ldots), \tag{10}$$

is (almost) completely extinguished in the second fiber.

Each MZI, including two spaced apart 3 dB fiber couplers with different fiber lengths between the two couplers, serves as a wavelength discriminator. Beyond the second coupler 16, a first fiber 11 passes (only) light having wavelengths near a first selected set of wavelengths, a second fiber 12 passes (only) light having wavelengths near a second selected set of wavelengths, and the first and second selected sets of wavelengths are mutually exclusive. Thus, if an MZI is placed at the end of, and receives light from, a fiber optic channel, the two output fibers for the MZI will each carry light having primarily a different selected set of wavelength components.

Where the MZI coupling coefficients $\alpha$ and $\beta$ in FIG. 2 are independent and satisfy $\alpha\neq 0.5$ and/or $\beta\neq 0.5$, the MZI is referred to as "non-symmetric". A transfer matrix analysis, employing the Jones-Mueller formalism, is used to analyze the electromagnetic components of a non-symmetric MZI. For the configuration shown in FIG. 2, the transfer matrix is a product of (1) a first coupling matrix ($\alpha$) for the first coupler, (2) light propagation and phase shift over the two arms having different lengths, L1 and L2, and (3) a second coupling matrix ($\beta$) for the second coupler. Complex electromagnetic vectors E1, having a magnitude $|E1|=1$, and E2, having a magnitude of 0, are received in the fibers, 11 and 12, respectively, and pass through the first coupler 15, along the two arms, 13 and 14, through the second coupler 16, and pass beyond the second coupler as vectors E3 and E4 in the respective fibers 11 and 12. A general transfer matrix for this procedure may be expressed as $$\begin{bmatrix} \sqrt{(1-\beta)} & -i\sqrt{(\beta)} \\ -i\sqrt{(\beta)} & \sqrt{(1-\beta)} \end{bmatrix} \begin{bmatrix} \exp(-ikL1) & 0 \\ 0 & \exp(-ikL2) \end{bmatrix} \tag{11}$$

$$\begin{bmatrix} \sqrt{(1-\alpha)} & -i\sqrt{(\alpha)} \\ -i\sqrt{(\alpha)} & \sqrt{(1-\alpha)} \end{bmatrix} \begin{bmatrix} E1 \\ E2 \end{bmatrix} = \begin{bmatrix} E3 \\ E4 \end{bmatrix}$$

$$k(L2-L1)=2\pi(c/\eta\lambda)((L2-L1)/c)=2\pi f\tau. \tag{12}$$

For the configuration discussed in the preceding, with $|E1|=1$ and $|E2|=0$, the transmissivity factors becomes $$T_{11}(f\tau)=|E3|^2/|E1|^2=\alpha\cdot\beta+(1-\alpha)\cdot(1-\beta)+2\sqrt{\{(1-\alpha)\cdot(1-\beta)\cdot\alpha\cdot\beta\}}\cos(2\pi f\tau), \tag{13}$$

$$T_{12}(f\tau)=|E4|^2/|E1|^2=\alpha\cdot(1-\alpha)+(1-\alpha)\cdot\alpha-2\sqrt{\{(1-\alpha)\cdot(1-b)\cdot\alpha\cdot b\}}\cos(2\pi f\tau), \tag{14}$$

and one verifies that $T_{11}(f\tau)+T_{12}(f\tau)=1$, as required for a lossless system.

For this non-symmetric MZI, each of the transmissivity factors $T_{11}(f\tau)$ and $T_{12}(f\tau)$ has a sequence of minimum values and a sequence of maximum values, $$T_{11,min}=\alpha\cdot\beta+(1-\alpha)\cdot(1-\beta)-2\sqrt{\{(1-\alpha)\cdot(1-\beta)\cdot\alpha\cdot\beta\}}, \tag{15}$$

$$T_{11,max}=\alpha\cdot\beta+(1-\alpha)\cdot(1-\beta)+2\sqrt{\{(1-\alpha)\cdot(1-\beta)\cdot\alpha\cdot\beta\}}, \tag{16}$$

each satisfying $0<T_{11,min}<T_{11,max}<1$, as long as $\alpha\neq 0.5$ and/or $\beta\neq 0.5$. Thus, light having a given wavelength component is never completely extinguished or discriminated against. Where the second type of filter is to be used in the cascade structure 10 in FIG. 1, the parameters, $\alpha$, $\beta$ and $\tau$, of the non-symmetric MZI are chosen so that wavelengths corresponding to the minimum values of the transmissivity factor $T_{11}(f\tau)$ or $T_{12}(f\tau)$ coincide with a specified periodic sequence of wavelengths. As noted in the preceding, this coincidence of transmissivity minima facilitates compliance with the BellCore flat-top passband standards. Suitable choices are $\alpha=1-\alpha=0.02-0.10$, and more preferably $\alpha=1-\beta=0.04-0.05$.

In FIG. 1, an input fiber optic channel 11 ("stage 0") receives light in a selected initial band of frequencies and includes an "inverted" FPE filter 18, having FPE parameters chosen to provide a relatively low optical finesse (F≦2), a selected FSR (preferably FSR=0.8/4 nm=0.2 nm), and with FPE transmission minima located at a selected sequence of approximately uniformly spaced frequencies. In one embodiment, the inverted FPE filter 18 is configured to provide a sequence of minima at specified wavelengths, spaced apart by about 0.8/4 nm=0.2 nm. The first stage includes an MZI 21, preferably positioned at the beginning or input end of the channel, for wavelength discrimination.

For one embodiment of the FPE 18, suitable parameter choices are d1=reflector separation=$6 \times 10^3$ $\mu$m, $\theta$1=angle of incidence=0–2°, $\eta$1=refractive index of separator=1, R1=mirror reflectivity=0.05, which provides an optical finesse F(18)=0.7. The finesse of an FPE is defined as $$F=\pi\sqrt{(R)}/(1-R), \qquad (17)$$

and the corresponding FPE transmission is $$T(\lambda)=\{1=4 \cdot F^2 \cdot \sin^2(2\pi\eta d \cdot \cos\theta/\lambda)/\pi^2\}^{-1}. \qquad (18)$$

Analysis of an FPE is set forth in A. Yariv, *Optical Electronics,* Holt, Rinehart and Winston, N.Y., Third Edition, 1985, pp. 87–95. With a choice of mirror reflectivity of R1=0.03, R1=0.10 and R1=0.24, the optical finesse becomes F(18)=0.56, F(18)=1.1 and F(18)=2.0, respectively. Optical insertion loss increases with reflectivity, and thus with finesse, so that choice of a relatively small finesse value may be preferable here.

The FPE 18 may be replaced by an equivalent MZI filter having a time delay parameter $\pi$ that is selected (1) to provide a sequence of transmission minima corresponding to a selected sequence of wavelengths and (2) to provide modest optical isolation by itself (corresponding to the relatively low value of finesse, F(18)≦2, for the FPE 18).

Assume that light having a sequence of uniformly spaced central wavelengths $\{\lambda_k\}$, satisfying $\lambda_1 < \lambda_2 < \lambda_3 < \lambda_4 < \lambda_5 < \ldots$ is to be separated using the cascade tree structure 10 shown in FIG. 1, ignoring the presence of the special filter arrays 18, 35-i (i=1, 2, 3, 4,) and 45-j (j=1, 2, . . . , 8). After an input light beam is received on the channel 13 and is passed through a conventional MZI 21, the portion of the light beam in the channel 23-1 contains wavelength components $\lambda_1, \lambda_3, \lambda_5, \lambda_7, \lambda_9, \lambda_{11}, \lambda_{13}, \lambda_{15}$, etc. and (ideally) contains none of the wavelength components $\lambda_2, \lambda_4, \lambda_6, \lambda_8, \lambda_{10}, \lambda_{12}, \lambda_{14}, \lambda_{16}$, etc.; and the portion of the light beam in the channel 23-2 contains wavelength components $\lambda_2, \lambda_4, \lambda_6, \lambda_8, \lambda_{10}, \lambda_{12}, \lambda_{14}, \lambda_{16}$, etc. and (ideally) contains none of the wavelength components $\lambda_1, \lambda_3, \lambda_5, \lambda_7, \lambda_9, \lambda_{11}, \lambda_{13}, \lambda_{15}$, etc. After the portion of the light beam in channel 23-1 is passed through the MZI 31-1, the portion of the light beam in the channel 33-1 contains (only) the wavelength components $\lambda_1, \lambda_5, \lambda_9, \lambda_{13}, \lambda_{17}, \lambda_{21}$, etc.; and the portion of the light beam in the channel 33-2 contains (only) the wavelength components $\lambda_2, \lambda_6, \lambda_{10}, \lambda_{14}, \lambda_{18}, \lambda_{22}$, etc.; After the portion of the light beam in channel 23-2 is passed through the MZI 31-2, the portion of the light beam in the channel 33-3 contains (only) the wavelength components $\lambda_2, \lambda_6, \lambda_{10}, \lambda_{14}, \lambda_{18}, \lambda_{22}$, etc.; and the portion of the light beam in the channel 33-4 contains (only) the wavelength components $\lambda_4, \lambda_8, \lambda_{12}, \lambda_{16}, \lambda_{20}, \lambda_{24}$, etc. This process of central wavelength decimation contin- ues each time the surviving portions of the light beam pass through MZIs 41-j (j=1, 2, 3, 4) in the third stage in the system 10 and through subsequent stages. Optionally, this process continues until an output channel has no more than one of the selected wavelength components.

Light, filtered by the FPE 18 (or by an equivalent MZI filter), is received by an MZI 21 that is part of the tree structure and is divided into first and second groups of wavelength sub-bands. The first and second portions of light from the MZI 21 in the first stage are received by the respective first and second channels, 23-1 and 23-2 of the first stage. Light in the first and second channels, 23-1 and 23-2 is already segregated into first and second frequency sub-bands, respectively, with substantially no wavelength overlap, using the MZI 21, as discussed in the preceding. Optionally, the FPE 18 could be removed from the input channel 13 (stage 0) and could be incorporated into each of the first and second channels, 23-1 and 23-2, in the first stage.

Light in each of the first and second channels, 23-1 and 23-2, of the first stage is received by an MZI, 31-1 and 31-2, respectively, at a second stage; and light in each of these two channels is thereby divided into first and second groups of central wavelengths, using wavelength discrimination Light from the first channel 23-1 of the first stage is passed through and MZI 31-1, is received in the third and fourth channels, 33-1 and 33-2, of the second stage of the system 10, and is thereby segregated into third and fourth wavelength sub-bands, with substantially no wavelength overlap. Light from the second channel 23-2 if the first stage is passed through and MZI 31-2, is received in the fifth and sixth channels, 33-3 and 33-4, of the second stage of the system 10, and is thereby segregated into fifth and sixth wavelength sub-bands, with substantially no wavelength overlap. The wavelength sub-bands for any pair of the third, fourth, fifth and sixth channels have substantially no overlap.

Light in each of the third channel 33-1, the fourth channel 33-2, the fifth channel 33-3 and the sixth channel 33-4 is passed through a selected filter mechanism, 35-1, 35-2, 35-3 and 35-4, respectively, positioned in the second stage and is passed through the respective wavelength discrimination MZI filters 41-1, 41-2, 41-3 and 41-4 in the third stage. The parameters of the filter mechanisms, 35-1, 35-2, 35-3 and 35-4, are chosen to provide a selected FSR for the second stage (preferably FSR=1.6 nm).

Light passed through the MZI 41-1 is received by seventh and eighth channels, 43-1 and 43-2, in the third stage and is thereby segregated into seventh and eighth wavelength sub-bands. Light passed through the MZI 41-2 is received by ninth and tenth channels, 43-3 and 43-4, in the third stage and is thereby segregated into ninth and tenth wavelength sub-bands. Light passed through the MZI 41-3 is received by eleventh and twelfth channels, 43-5 and 43-6, in the third stage and is thereby segregated into eleventh and twelfth wavelength sub-bands. Light passed through the MZI 41-4 is received by thirteenth and fourteenth channels, 43-7 and 43-8, in the third stage and is thereby segregated into thirteenth and fourteenth wavelength sub-bands. The wavelength sub-bands for any pair of the seventh, eighth, ninth, tenth, eleventh, twelfth, thirteenth and fourteenth channels have substantially no overlap.

Light in each of the seventh, eighth, ninth, tenth, eleventh, twelfth, thirteenth and fourteenth channels, 43-1, 43-2, 43-3, 43-4, 43-5, 43-6, 43-7 and 43-8, in the third stage is passed through a selected filter mechanism, 45-1, 45-2, 45-3, 45-4, 45-5, 45-6, 45-7 and 45-8, respectively, positioned in the third stage and is passed through the respective wavelength discrimination MZI filters 51-1, 51-2, 51-3, 51-4, 51-5, 51-6, 51-7 and 51-8 in the four stage. The parameters of the filter mechanisms, 45-1, 45-2, 45-3, 45-4, 45-5, 45-6, 45-7 and 45-8, are chosen to provide a selected FSR for the third stage (preferably FSR=3.2 nm).

Light passed through the MZI 51-1 is received by fifteenth and sixteenth channels, 53-1 and 53-2, in the fourth stage and is thereby segregated into fifteenth and sixteenth wavelength sub-bands. Light passed through the MZI 51-2 is received by seventeenth and eighteenth channels, 53-3 and 53-4, in the fourth stage and is thereby segregated into seventeenth and eighteenth wavelength sub-bands. Light passed through the MZI 51-3 is received by nineteenth and twentieth channels, 53-5 and 53-6, in the fourth stage and is thereby segregated into nineteenth and twentieth wavelength sub-bands. Light passed through the MZI 51-4 is received by twenty-first and twenty-second channels, 53-7 and 53-8, in the fourth stage and is thereby segregated into twenty-first and twenty-second wavelength sub-bands. Light passed through the MZI 51-5 is received by twenty-third and twenty-fourth channels, 53-9 and 53-10, in the fourth stage and is thereby segregated into twenty-third and twenty-fourth wavelength sub-bands. Light passed through the MZI 51-6 is received by twenty-fifth and twenty-sixth channels, 53-11 and 53-12, in the fourth stage and is thereby segregated into twenty-fifth and twenty-sixth wavelength sub-bands. Light passed through the MZI 51-7 is received by twenty-seventh and twenty-eighth channels, 53-13 and 53-14, in the fourth stage and is thereby segregated into twenty-seventh and twenty-eighth wavelength sub-bands. Light passed through the MZI 51-8 is received by twenty-ninth and thirtieth channels, 53-15 and 53-16, in the fourth stage and is thereby segregated into twenty-ninth and thirtieth wavelength sub-bands. The wavelength sub-bands for any pair of the fifteenth through thirtieth channels have substantially no overlap.

Light in the respective channels, 53-1, 53-2, 53-3, 53-4, 53-5, 53-6, 53-7, 53-8, 53-9, 53-10, 53-11, 53-12, 53-13, 53-14, 53-15 and 53-16, is passed through the respective wavelength discrimination MZIs, 61-1, 61-2, 61-3, 61-4, 61-5, 61-6, 61-7, 61-8, 61-9, 61-10, 61-11, 61-12, 61-13, 61-14 61-15 and 61-16 in the fifth stage. Each of the MZIs, 61-1, 61-2, 61-3, 61-4, 61-5, 61-6, 61-7, 61-8, 61-9, 61-10, 61-11, 61-12, 61-13, 61-14, 61-15 and 61-16, segregates the received light into two substantially nonoverlapping wavelength sub-bands, which appear on the channels 63-i (i=1, 2, . . . , 32). Light processing in subsequent stages (number six and higher) is similar to light processing in stage four or stage five. For the embodiment 10 shown in FIG. 1, a total of 31 MZI wavelength discriminators plus 4 MZI filters plus 9 FPE filters are required. No additional wavelength filtering, other than that provided by a wavelength discrimination MZI at the beginning of each stage, is required.

In a preferred embodiment, each of the selected filter mechanisms, 35-1, 35-2, 35-3 and 35-4, in the second stage is a specially designed MZI having a selected FSR≈1.6 nm; and each of the filter mechanisms, 45-1, 45-2, 45-3, 45-4, 45-5, 45-6, 45-7 and 45-8, in the third stage is an FPE having a selected finesse of modest size (F≈6) and a selected FSR≈3.2 nm. The transmission maxima of these MZIs and these FPEs are located at a selected sequence of approximately uniformly spaced wavelengths, preferably corresponding to central wavelengths of the output channels.

In one embodiment, an FPE, such as 45-1, has the following optical and geometrical parameters:

$d3$=reflector separation=375 $\mu$m, $\theta 3$=angle of incidence=0–2°, $\eta 3$=refractive index of separator=1, $R3$=mirror reflectivity=0.60, with similar optical and geometrical values for the other seven FPEs, 45-2, 45-3, 45-4, 45-5, 45-6, 45-7 and 45-8, in the third stage.

The selected filter mechanisms, 18 (FPE or non-symmetric MZI), 35-i (i=1, 2, 3, 4; MZI) and 45-j (j=1, 2, . . . , 8; FPE), shown in a preferred embodiment 10 in FIG. 1, may be varied and exchanged to provide qualitatively similar results. As a first example, an FPE filter (corresponding to the FPE 18) can be incorporated into any of stage 0, the first stage, the second stage and the third stage. As a second example, an MZI filter mechanism (corresponding to the MZI filter 18) can be incorporated into any of stage 0, the first stage, the second stage and the third stage. As a third example, MZI filters (corresponding to the selected MZI filter mechanisms 35-1, 35-2, 35-3 and 35-4) can be incorporated into any of stage 0 or any later stage (i=1, 2, 3, 4, . . . ). As a fourth example, the selected FPE filters (corresponding to the FPE filter mechanisms 45-1, 45-2, 45-3, 45-4, 45-5, 45-6, 45-7 and 45-8) can be incorporated into any of stage 0 or any later stage (1, 2, 3, 4, . . . ). However, each of these permutations will require its own set of optical parameters in order to satisfy the BellCore standards.

The cascade tree structure 10 shown in FIG. 1 provides 32 output channels (more, with additional stages included), each with a corresponding set of wavelength components that do not substantially overlap. The cascade tree structure 10 shown in FIG. 1 is optionally a standard cascade structure that also incorporates special purpose filter mechanisms in one or more of the zeroth, first, second and third stages. A standard cascade tree structure for DWDM applications is disclosed by P. Chen in U.S. Pat. Nos. 5,809,190 and 5,987,201, incorporated by reference herein. Use of a Fabry-Perot etalon as a filter in a fiber optic channel is disclosed by Colbourne in U.S. Pat. No. 5,666,225, incorporated by reference herein.

Figure 3:
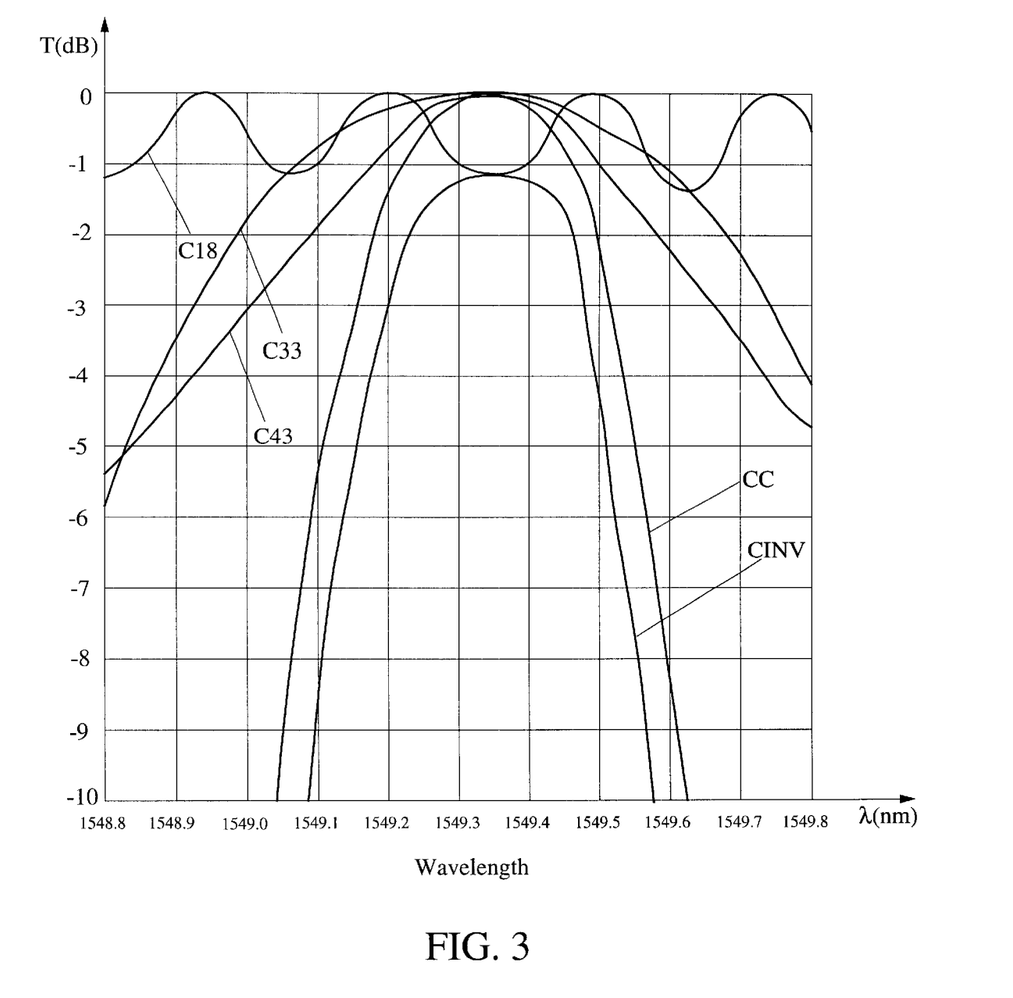
FIG. 3 graphically compares signal transmission for single stage filters and cascade tree structure DWDM devices, without and with three kinds of special purpose filters in selected stages.

FIG. 3 graphically illustrates the transmission versus wavelength responses for the FPE 18 (C18), for the MZI 35-1 (C35), and for the FPE 45-1 (C45). FIG. 3 also graphically compares the transmission versus wavelength responses of a conventional MZI cascade tree structure without filtering (CC) and of one maximum (among 32 periodic maxima) of a cascade MZI structure that incorporates the filter mechanism of the invention (CINV). Note that the wavelength for which a transmission minimum occurs in the FPE 18 is chosen to coincide with the wavelength for which a maximum occurs for the conventional structure (CC). One result of this coincidence is that the top portion of the curve CINV becomes flattened, producing a flat-top behavior that complies with the BellCore standards, as discussed in the following.

Figure 4:
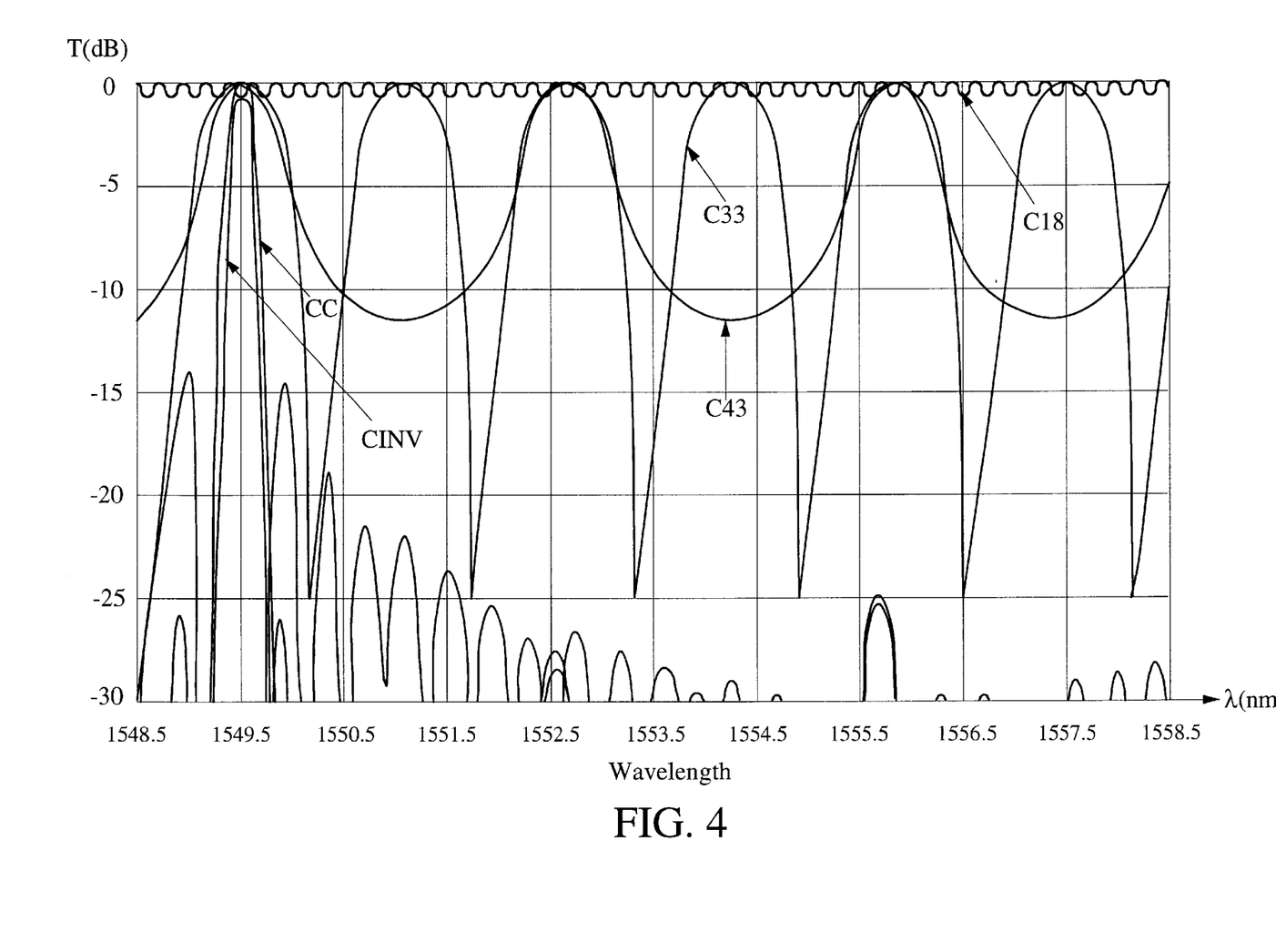
FIG. 4 is a graphical view of signal transmission between adjacent channels for a cascade DWDM structure constructed according to the invention, without and with three kinds of special purpose filters.

FIG. 4 graphically compares the optical isolation and flat-top passband response (transmissivity versus wavelength) achieved using the invention (curves CINV) and using a conventional approach (curves CC). The curves C18, C35 and C45 illustrate the transmission effects of including the individual filters FPE 18 (C18), MZI 35-i (C35) and FPE 45-j (C45). Note that the sidebands provided by a conventional structure have an associated optical isolation of about −13 dB, and that the optical isolation provided by the invention (first embodiment) is about −25 dB. The optical isolation provided by the invention can be improved to a value less than −25 dB by modified choices of the optical parameters used for the FPE filter 18, for the MZI filters 35-i and/or for the FPE filters 45-j.

Figure 5:
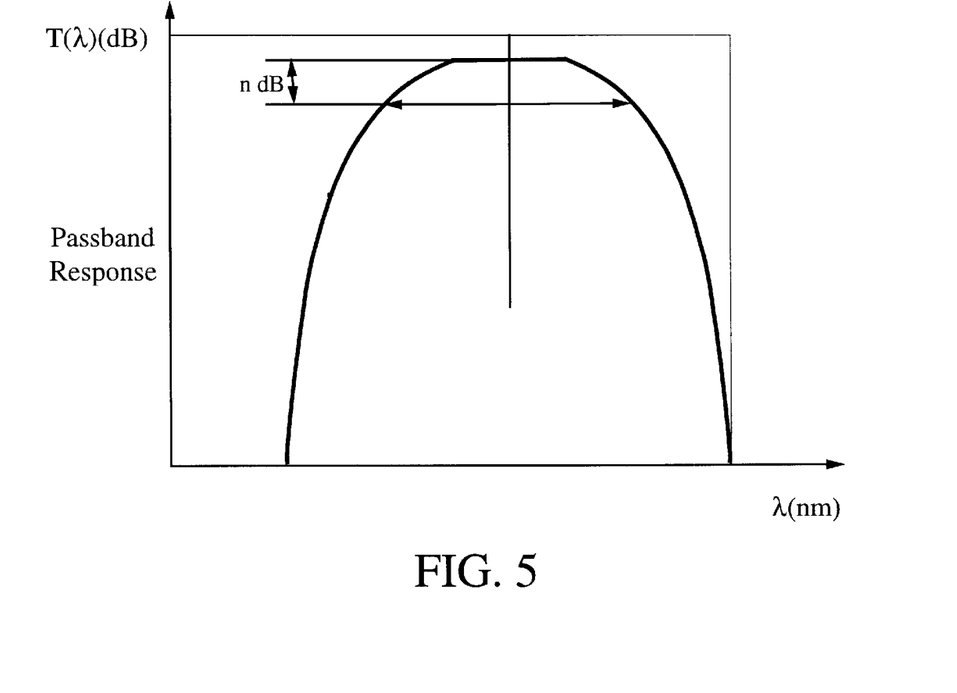
FIG. 5 illustrates the transmissivity required by the BellCore standards.

FIG. 5 illustrates the flat-top passband response and optical isolation required by the BellCore standards. These standards for certain individual decrements are set forth in Table 1.

TABLE 1

Transmissivity Standards

| Decrement | Bandwidth Requirement |
|---|---|
| −1 dB | ≥0.35 times channel spacing |
| −3 dB | ≥0.50 times channel spacing |
| −20 dB | ≤1.5 times channel spacing |
| −30 dB | ≤2.2 times channel spacing |

The required channel spacings are 0.8 nm, 1.6 nm, 3.2 nm, 6.4 nm and 12.8 nm.

What is claimed is:

1. A system for processing light, the system comprising:
an (N+1)-stage fiber optic cascade structure, numbered n=0, 1, 2, ..., N with N≧5, with stage number 0 being a light input channel, with stage number n'(1≦n'≦N) having $2^{n'}$ fiber optic channels and each channel in each stage n" being connected to two channels in stage n"+1(n"=0, 1, 2, ..., N−1) by a Mach-Zehnder interferometer, referred to as an "MZI";
a first filter array, positioned in a selected stage n1 and including $2^{n1}$ selected Fabry-Perot etalons, referred to as "FPEs," with each FPE in stage n1 having transmission minima at a first selected sequence of wavelengths and being positioned in one of the $2^{n1}$ channels of stage n1, where n1 lies in the range 0≦n1≦N1, where N1≦N;
a second filter array, positioned in a selected stage n2 and including $2^{n2}$ selected MZI filters, each MZI filter having transmission maxima at a second selected sequence of wavelengths and being positioned in one of the $2^{n2}$ channels of stage n2, where n2 lies in the range 0≦n2≦N2; where N2 ≦N; and
a third filter array, positioned in a selected stage n3 and including $2^{n3}$ selected FPEs, with each FPE in stage n3 having transmission maxima at a third selected sequence of wavelengths and being positioned in one of the $2^{n3}$ channels of stage n3, where n3 lies in the range 0≦n3≦N3, where N3≦N.

2. The system of claim 1, wherein N=5 and said system provides a wavelength spacing between at least two of said channels in said stage N of about 50 GHz.

3. The system of claim 1, wherein N=5 and at least one of the following selections is made for said stage numbers n1, n2 and n3: n1=0, n2=2 and n3=3.

4. The system of claim 1, wherein at least one of said stage n1 FPEs is chosen to have a finesse no greater than 2 and to have a free spectral range of approximately 0.2 nm.

5. The system of claim 1, wherein at least one of said stage n1 FPEs is chosen to have a finesse no greater than 1.5.

6. The system of claim 1, wherein at least one of said stage n1 FPEs is chosen to have a finesse no greater than 1.

7. The system of claim 1, wherein at least one of said stage n2 non-symmetric MZIs is chosen to have a free spectral range of approximately 1.6 nm.

8. The system of claim 1, wherein at least one of said stage n3 FPEs filters is chosen to have a finesse of about 6 and to have a free spectral range of approximately 3.2 nm.

9. A system for processing light, the system comprising:
an (N+1)-stage fiber optic cascade structure, numbered n=0, 1, 2, ..., N with N ≧5, with stage number 0 being a light input channel, with stage number n'(1≦n'≦N) having $2^{n'}$ fiber optic channels and each channel in each stage n" being connected to two channels in stage n"+1(n"=0, 1, 2, ..., N−1) by a Mach-Zehnder interferometer, referred to as an "MZI";
a first filter array, positioned in a selected stage n1 and including $2^{n1}$ selected non-symmetric MZIs with each non-symmetric MZI in stage n1 having at least one coupling coefficient α<0.5 and having transmission minima at a first selected sequence of wavelengths and being positioned in one of the $2^{n1}$ channels of stage n1, where n1 lies in the range 0≦n1≦N1, where N1≦N;
a second filter array, positioned in a selected stage n2 and including $2^{n2}$ selected MZI filters, each MZI filter having transmission maxima at a second selected sequence of wavelengths and being positioned in one of the $2^{n2}$ channels of stage n2, where n2 lies in the range 0≦n2≦N2, where N2≦N; and
a third filter array, positioned in a selected stage n3 and including $2^{n3}$ selected FPEs, with each FPE in stage n3 having transmission maxima at a third selected sequence of wavelengths and being positioned in one of the $2^{n3}$ channels of stage n3, where n3 lies in the range 0≦n3≦N3, where N3≦N.

10. The system of claim 9, wherein N=5 and said system provides a wavelength spacing between at least two of said channels in said stage N of about 50 GHz.

11. The system of claim 9, wherein N=5 and at least one of the following selections is made for said stage numbers n1, n2 and n3: n1=0, n2=2 and n3=3.

12. The system of claim 9, wherein at least one of said stage n1 FPEs is chosen to have a finesse no greater than 2 and to have a free spectral range of approximately 0.2 nm.

13. The system of claim 9, wherein at least one of said stage n1 FPEs is chosen to have a finesse no greater than 1.5.

14. The system of claim 9, wherein at least one of said stage n1 FPEs is chosen to have a finesse no greater than 1.

15. The system of claim 9, wherein at least one of said stage n2 non-symmetric MZIs is chosen to have a free spectral range of approximately 1.6 nm.

16. The system of claim 9, wherein at least one of said stage n3 FPEs filters is chosen to have a finesse of about 6 and to have a free spectral range of approximately 3.2 nm.

17. A method for processing light, the method comprising:
receiving light at an (N+1)-stage fiber optic cascade structure, numbered n=0, 1, 2, ..., N with N≧5 with stage number 0 being a light input channel, with stage number n'(1≦n'≦N) having $2^{n'}$ fiber optic channels and each channel in each stage n" being connected to two channels in stage n"+1(n"=0, 1, 2, ..., N−1) by a Mach-Zehnder interferometer, referred to as an "MZI";
passing the received light through a first filter array, positioned in a selected stage n1 and including $2^{n1}$ selected Fabry-Perot etalons, referred to as "FPEs," with each FPE in stage n1 having transmission minima at a first selected sequence of wavelengths and being positioned in one of the $2^{n1}$ channels of stage n1, where n1 lies in the range 0≦n1≦N1, where N1≦N;
passing the received light through a second filter array, positioned in a selected stage n2 and including $2^{n2}$ selected MZI filters, each MZI filter having transmission maxima at a second selected sequence of wavelengths and being positioned in one of the $2^{n2}$ channels of stage n2, where n2 lies in the range $0 \leq n2 \leq N2$; where $N2 \leq N$; and passing the received light through a third filter array, positioned in a selected stage n3 and including $2^{n3}$ selected FPEs, with each FPE in stage n3 having transmission maxima at a third selected sequence of wavelengths and being positioned in one of the $2^{n3}$ channels of stage n3, where n3 lies in the range $0 \leq n3 \leq N3$, where $N3 \leq N$.

18. The method of claim 17, further comprising choosing N=5 and providing a wavelength spacing between at least two of said channels in said stage N of about 50 GHz.

19. The method of claim 17, further comprising choosing N=5 and choosing at least one of the following selections for said stage numbers n1, n2 and n3: n1=0, n2=2 and n3=3.

20. The method of claim 17, further comprising choosing at least one of said stage n1 FPEs to have a finesse no greater than 2 and to have a free spectral range of approximately 0.2 nm.

21. The method of claim 17, further comprising choosing at least one of said stage n1 FPEs to have a finesse no greater than 1.5.

22. The method of claim 17, further comprising choosing at least one of said stage n1 FPEs to have a finesse no greater than 1.

23. The method of claim 17, further comprising choosing at least one of said stage n2 non-symmetric MZIs to have a free spectral range of approximately 1.6 nm.

24. The method of claim 17, further comprising choosing at least one of said stage n3 FPEs filters to have a finesse of about 6 and to have a free spectral range of approximately 3.2 nm.

25. A method for processing light, the method comprising:

receiving light at an (N+1)-stage fiber optic cascade structure, numbered n=0, 1, 2, ..., N with $N \geq 5$, with stage number 0 being a light input channel, with stage number n'($1 \leq n' \leq N$) having $2^{n'}$ fiber optic channels and each channel in each stage n" being connected to two channels in stage n"+1(n"=0, 1, 2, ..., N-1) by a Mach-Zehnder interferometer, referred to as an "MZI";

passing the received light through a first filter array, positioned in a selected stage n1 and including $2^{n1}$ selected non-symmetric MZIs with each non-symmetric MZI in stage n1 having at least one coupling coefficient ($\alpha < 0.5$ and having transmission minima at a first selected sequence of wavelengths and being positioned in one of the $2^{n1}$ channels of stage n1, where n1 lies in the range $0 \leq n1 \leq N1$, where $N1 \leq N$;

passing the received light through a second filter array, positioned in a selected stage n2 and including $2^{n2}$ selected MZI filters, each MZI filter having transmission maxima at a second selected sequence of wavelengths and being positioned in one of the $2^{n2}$ channels of stage n2, where n2 lies in the range $0 \leq n2 \leq N2$; where $N2 \leq N$; and passing the received light through a third filter array, positioned in a selected stage n3 and including $2^{n3}$ selected FPEs, with each FPE in stage n3 having transmission maxima at a third selected sequence of wavelengths and being positioned in one of the $2^{n3}$ channels of stage n3, where n3 lies in the range $0 \leq n3 \leq N3$, where $N3 \leq N$.

26. The method of claim 25, further comprising choosing N=5 and providing a wavelength spacing between at least two of said channels in said stage N of about 50 GHz.

27. The method of claim 25, further comprising choosing N=5 and choosing at least one of the following selections for said stage numbers n1, n2 and n3: n1=0, n2=2 and n3=3.

28. The method of claim 25, further comprising choosing at least one of said stage n1 FPEs to have a finesse no greater than 2 and to have a free spectral range of approximately 0.2 nm.

29. The method of claim 25, further comprising choosing at least one of said stage n1 FPEs to have a finesse no greater than 1.5.

30. The method of claim 25, further comprising choosing at least one of said stage n1 FPEs to have a finesse no greater than 1.

31. The method of claim 25, further comprising choosing at least one of said stage n2 non-symmetric MZIs to have a free spectral range of approximately 1.6 nm.

32. The method of claim 25, further comprising choosing at least one of said stage n3 FPEs filters to have a finesse of about 6 and to have a free spectral range of approximately 3.2 nm.

* * * * *